3,375,161
4-CYANO-3,5-DICHLOROISOTHIAZOLE AS A MICROBIOCIDE
Gert P. Volpp, Princeton, N.J., assignor to FMC Corporation, New York, N.Y., a corporation of Delaware
No Drawing. Filed May 12, 1967, Ser. No. 637,931
2 Claims. (Cl. 167—33)

ABSTRACT OF THE DISCLOSURE

Compositions containing 4-cyano-3,5-dichloroisothiazole are effective in suppressing or eliminating microorganisms which attack oil, emulsion paints and textiles and cause slime formation in paper pulp.

---

Background of the invention

Field of the invention

This invention relates to microbiocides. More particularly, it pertains to the use of 4-cyano-3,5-dichloroisothiazole as microbiocide and to microbiocidal compositions containing it.

Description of the prior art

Isothiazoles in the form of their simple monocyclic derivatives as well as the parent ring are of relatively recent vintage having been first reported in 1956 by Adams and Slack (Chemistry and Industry, 1956, 1232). Only condensed ring systems such as benzoisothiazoles were known before. In the decade following their discovery, the simple monocyclic isothiazoles have been investigated extensively. These studies demonstrated that among other properties, certain of the isothiazoles possess biological activity. For instance, U.S. patents 3,155,679 and 3,155,678 disclose various isothiazoles which are useful as herbicides and fungicides.

Summary of the invention

I have now discovered that a particular isothiazole derivative, to wit 4-cyano-3,5-dichloroisothiazole is an unusually potent microbiocide being surprisingly effective against a broad spectrum of microorganisms of the type that cause extensive industrial damage in that they attack oil and emulsion paints and textiles and cause slime formation in paper pulp. The use of the aforesaid isothiazole as a microbiocide including the preparation and use of compositions containing it, constitutes the principal object and purpose of this invention. Other objects and purposes will become manifest subsequently.

General description and preferred embodiment

The herein 4-cyano-3,5-dichloroisothiazole is a known chemical entity the description and preparation of which is set forth in the technical literature. A detailed synthesis of the compound can be found in the previously referred to U.S. Patent 3,155,678. The synthesis is based on the reaction of 2,2-dicyano-1,1-disodiomercaptoethylene with thionyl chloride.

The 4-cyano-3,5-dichloroisothiazole of the present invention can be formulated or made up into microbiocidal compositions in numerous ways depending on the circumstances under which such compositions are used. For instance, liquid microbiocidal compositions can be produced by dissolving the active component of the invention in an organic solvent followed by dispersion in water preferably in the presence of a surface active agent. In some instances, it may be preferable to employ this compound in the form of a solid in which case the toxicant is commonly blended with certain inert carriers which are selected for their ability to form homogenous powders suitable for applying as a dust to the particular substrate to be protected.

In preparing the aforesaid formulations, the active component is used in amounts sufficient to exert a microbiocidal effect. Satisfactory results are produced when the toxicants constitute less than 1% up to about 50% of the total weight of the composition although in the interest of economy, low concentrations are preferred. In this connection, many factors must be considered such as the particular compound, its solubility as well as the nature of the carrier and mode of application. These are factors to which those skilled in the microbiocidal art are cognizant.

In compounding the solid formulations of the compound herein, it is diluted or otherwise extended with inert solids in the form of dust or powders. For this purpose, resort is had to such materials as diatomaceous earth, synthetic fine silica, calcium silicate, bentonite, talc and the like. Preferably the solid carriers should be finely divided and it is desirable that they be less than 20 microns.

In the event a liquid microbiocidal composition is called for, the active compound is advantageously dissolved in a suitable liquid solvent. The resulting solution can either be used as prepared or it may be conveniently diluted with water thus forming a dispersion of the toxicant. If a water immiscible solvent is selected to effect dissolution of the toxicant, then dispersions prepared therefrom will consist of oily droplets of dissolved toxicant distributed throughout the aqueous medium. On the other hand, if a water immiscible solution of a compound is employed and diluted with water, then the resulting dispersions will consist of minute particles of the active solid component distributed throughout the continuous aqueous phase. Typical of water immiscible solvents for use as above-described are kerosene, stoddard solvent, aromatic hydrocarbons such as xylene, toluene, and the like; higher alcohols, alkylated naphthalenes, etc. Suitable water miscible solvents include the lower water soluble ketones as exemplified by acetone and methyl ethyl ketones, certain of the lower amides such as dimethylformamide, diethylformamide and the like, lower saturated aliphatic alcohols as typified by ethanol, isopropanol, various glycol ethers particularly Cellosolves such as methyl Cellosolve, ethyl Cellosolve and the like.

As previously mentioned, solvent solutions of the toxicant compound are designed to be used as such. However, they are commonly extended with large quantities of water to form dispersion preferably in the presence of a surface active agent including those of the anionic, cationic, or nonionic types. Examples of these adjuncts are the sulfonated animal and vegetable oils, sulfonated petroleum oils, sodium lauryl sulfonate, ethylene oxide condensation products of the type produced by reacting octylphenol with ethylene oxide and the like. In general, we have ascertained that excellent results ensue when the surface active agent can constitute about 1–15% by weight of the composition.

In determining the microbiocidal properties of the herein 4-cyano-3,5 dichloroisothiazole, we have made use of the normal testing and screening procedures, the details of which are given below.

Germicide screening

This is a modification of the cylinder-cup method used to assay antibiotics and other microbiocides. It consists of culturing on an appropriate nutrient medium one or more test fungi or bacteria in such a way that the organisms will be exposed to the test compounds. In the test used here, one fungus culture is used per test plate while several cultures of bacteria can be so streaked on the plate to allow exposure to the test compound.

In practice, exposure of the test organism is affected by placing a ring af about 10-12 mm. inside diameter (plastic or glass) in the center of the seeded plate and placing therein a sample of the test compound weighing approximately 0.25 grams.

The fungal plates are incubated at 280 C. for 72 hours. If a clear zone results (an area where the organism does not grow) it is deduced that the compound under test is toxic and is inhibiting the test organism in that area. Appropriate controls with test rings, but lacking candidate compounds are set up each time. The distance of the clear zone from the nearest growth to the ring in millimeters measures the inhibition. A similar procedure is carried out with bacteria except that incubation is at 37° C. and readings are made after 24-36 hours incubation.

The nutrient medium used for fungal tests is malt agar; that used for bacteria is nutrient agar.

The test fungi are: *Aspergillus niger*, *Penicillium expansum*, *Pullularia pullulans* and *Alternaria solani*.

The test bacteria are: *Bacillus mycoides*, a gram positive; and *Aerobacter aerogenes*, a gram negative bacterium.

When screened in the above-described manner, the 4-cyano-3,5-dichloroisothiazole of the invention showed complete inhibition of all the test organisms.

*Assay of paint fungicides*

This test is an accelerated technique designed to evaluate the mildew resistance of fungicidally-treated paint. The fungus is *Pullularia pullulans* and is one of the most frequent causes of paint discoloration. This organism is found on both exterior and interior surfaces. In addition, *Aspergillus niger* and *Aspergillus oryzae* are useful in evaluating paint fungicides since they are of common occurrence and also possess so many alternative metabolic pathways that inhibition of these organisms is rather good indication of the value of a fungicide. These three organisms are, therefore, used in this test.

*Procedure: Application of test paints.*—Sheets of Whatman No. 1 filter paper are given two brush coats of untreated and treated paint. Twenty-four hours drying time are allowed between coats. After drying, sheets are cut up into 1 inch squares for use in the initial test.

*Culture medium preparation.*—The culture medium consists of Difco [1] or BBL Malt [2] Agar prepared according to direction. For a slightly harder agar an additional ½ percent agar-agar is added to the dehydrated medium. The culture medium is sterilized at 15-20 pounds gauge pressure for 15-20 minutes. Approximately 25 mls. of the sterile medium is then poured into each petri dish and allowed to harden.

*Inoculum preparation.*—The inoculum is prepared from 10-14 day old cultures of each of the test organisms. Care is taken that abundant spore formation has occurred. Approximately 10 mls. of sterile water are added to the agar slant culture. Using a sterile wire loop, the surface of the culture is scraped and the suspension transferred to a dilution bottle containing glass beads. This procedure is repeated with two additional 10 ml. washings. The volume is then made up to 100 mls.

*Inoculation of test plates.*—The inoculum is dispersed thoroughly by vigorous shaking. Approximately 1.0 ml. of the spore suspension is distributed over the surface of the hardened plate at the same time the plate is tilted to insure uniform distribution. The unleached painted filter paper squares are dipped for 3 seconds in boiling water and then into spore suspension of the particular test fungus. One inoculated square is placed upon each plate. All tests are performed in triplicate. Incubation is at 28° C. for 28 days; observations made weekly.

Complete inhibition of the test organisms was obtained when the wet paint contained 2.0% of the herein 4-cyano-3,5-dichloroisothiazole.

*Slimicide test procedure.*—The test described here is designed to simulate mill conditions without introducing some of the uncontrolled variables encountered in use of actual mill pulp. One of the greatest difficulties is obtaining pulp free of germicides. Also, the variation in microbial load from one time to another can introduce an uncontrolled variable. The use of a synthetic pulp which is reasonably reproducible from test to test would seem to be justified when comparisons are to be made.

*Pulp preparation.*—The pulp is prepared from filter paper which is macerated in a blender. The liquid portion is so adjusted that there will be approximately 1% solids based upon the total volume weight. To this "pulp" is added 0.25% glucose to act as a quick carbohydrate source for the test organisms and also to simulate the natural sugars residual in pulp.

After placing in suitable containers of uniform shape and size, sterilization is carried out at 15 pounds pressure for 15 minutes. Upon cooling, the test compounds are placed in the jars at the appropriate concentration and the jars are then placed on a shake machine for an hour to allow the compounds to reach their maximum solubility. The jars are then inoculated with uniform amounts of the test organisms. The covered but unsealed test jars are then placed on the shake machine for 24 hours after which sampling is carried out on suitable media to determine if viable organisms are still present after this exposure period.

*Test as a bacteriacide.*—Two bacteria commonly encountered in mill slimes are used. *Aerobacter aerogenes* and *Bacillus mycoides*. The toxicant for the bactericidal test is adjusted to 1000 p.p.m. The inoculum is uniform for all test containers and consists of the introduction of approximately one million bacteria per test container. After the twenty-four hour shake, streaking on nutrient agar is carried out to determine if complete kill is achieved. At the 1000 p.p.m. level complete kill is usually achieved in twenty-four hours with most of the presently used slimicides.

*Fungicidal test.*—The test fungi used are *Aspergillus niger* and *Penicillum expansum*, which are known causes of slime formation. The toxicant is introduced at 10,000 p.p.m., a level at which many of the commercial slimicides will kill *A. niger* after twenty-four hours contact. Inoculum consists of a uniform spore suspension of each of the two test organisms. A uniform amount is added to each test jar. After twenty-four hours of shaking, streaking is carried out on potato dextrose agar to determine if complete kill is achieved.

*Controls.*—Appropriate commercial slimicides are used as controls.

The 4-cyano-3,5-dichloroisothiazole of the invention caused complete kill of the aforenamed test organisms.

*Microbiological test methods of fabric fungicides.*—The test described here is a modification of the soil suspension test given in Federal Specification CCC-T-191b, Textile Test Methods.

The fabric to be tested is treated with the candidate fungicide in such a manner that 1% compound based upon the dry weight of the fabric is deposited. This can be accomplished by padding or by 100% saturation of the fibers.

After drying, the samples are cut into 1 inch squares. The culture medium used is potato dextrose agar (Difco). The inoculum is prepared by mixing 100 grams of good garden soil in 200 milliliters of sterile water, allowing to stand for thirty minutes and then filtering to remove large ---
[1] This is a typical agar commonly used in preparing culture media. Difco was purchased from the Digestive Fermentation Company.
[2] This is a typical agar commonly used in preparing culture media. BBL Malt Agar was purchased from the Baltimore Biological Laboratories.

particles of soil. To the filtered mixture, a spore suspension of *Aspergillus niger* and *Alernaria solani* are used. Both these organisms are known to cause fabric discoloration and deterioration particularly vinyl coated fabrics. Sufficient inoculum is added to the culture plates to cover the surface of the agar. The 1 inch test squares of fabric are then placed on the culture surface.

Incubation is carried out for two weeks at 28° C. Observations are made weekly or more frequently.

Results are reported as heavy growth, moderate growth, light growth or no growth.

When tested in the aforedescribed manner, the herein 4-cyano-3,5-dichloroisothiazole prevented all growth of the test microorganisms.

Various changes and modifications may be made in practicing the invention without departing from the spirit and scope thereof and the invention is not to be limited except as defined in the appended claims.

What is claimed is:

1. A method of inhibiting and controlling the growth of fungi and bacteria comprising contacting said microorganisms with a microbiocidally effective amount of 4-cyano-3,5-dichloroisothiazole.

2. A method of inhibiting and controlling the growth of microorganisms selected from the class consisting of fungi and bacteria of a type that produce rotting of oil and emulsion paints and textiles and produce slime in paper pulp comprising contacting said microorganisms with a microbiocidally effective amount of 4-cyano-3,5-dichloroisothiazole.

References Cited

UNITED STATES PATENTS

| 3,118,901 | 1/1964 | Hatchard | 260—302 |
| 3,149,107 | 9/1964 | Hatchard | 260—247.1 |
| 3,155,678 | 11/1964 | Hatchard | 260—302 |
| 3,155,679 | 11/1964 | Hatchard | 260—302 |
| 3,226,423 | 12/1965 | Vest | 260—465.5 |

OTHER REFERENCES

Hatchard, J. Org. Chem. 28(8); 2163–4 (1963).
Hatchard, J. Org. Chem. 29(3); 660–665 (1964).

LEWIS GOTTS, *Primary Examiner.*

S. K. ROSE, *Assistant Examiner.*

UNITED STATES PATENT OFFICE
CERTIFICATE OF CORRECTION

Patent No. 3,375,161                                      March 26, 1968

Gert P. Volpp

It is certified that error appears in the above identified patent and that said Letters Patent are hereby corrected as shown below:

Column 1, line 24, after "as" insert -- a --. Column 3, line 8, "280 C." should read -- 28° C. --; line 69, after "into" insert -- the --. Column 5, line 2, "Al ernaria", in italics, should read -- Alternaria --, in italics; same line 2, "used" should read -- added --.

Signed and sealed this 18th day of November 1969.

(SEAL)
Attest:

Edward M. Fletcher, Jr.                                WILLIAM E. SCHUYLER, JR.
Attesting Officer                                          Commissioner of Patents